Nov. 12, 1935.    L. W. HODGES    2,020,644
TEMPERING VALVE
Filed April 18, 1932
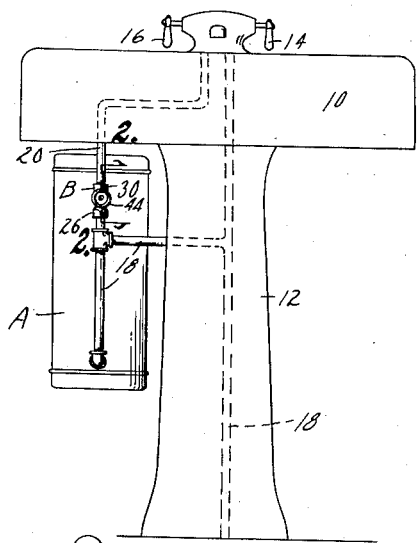
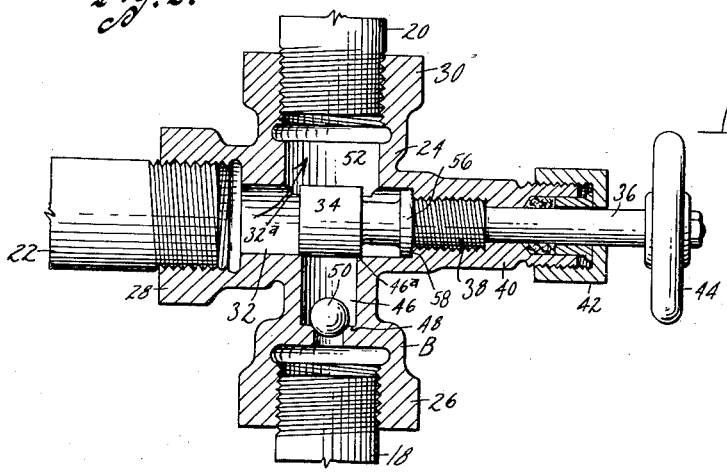
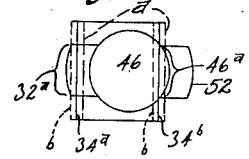
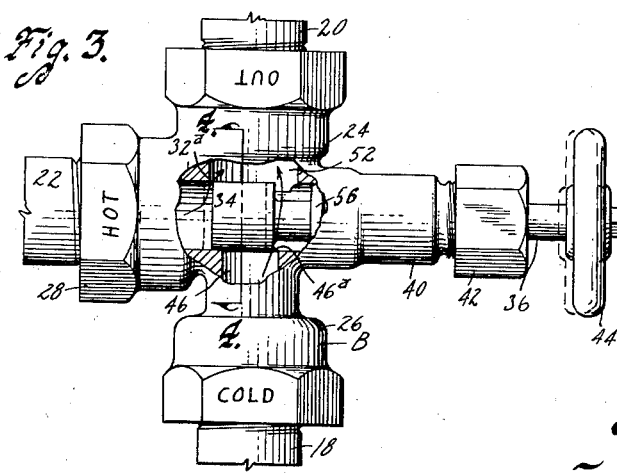
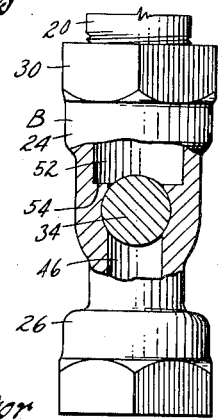
Inventor
~ Lee W. Hodges ~
By Bair, Freeman & Sinclair
Attorneys
Witness
H. S. Munzenmaier Patented Nov. 12, 1935

2,020,644

UNITED STATES PATENT OFFICE 2,020,644

TEMPERING VALVE

Lee W. Hodges, Defiance, Ohio, assignor to Saturn Heater Corporation, Bryan, Ohio, a corporation of Ohio Application April 18, 1932, Serial No. 605,925

4 Claims. (Cl. 277—65)

The object of my invention is to provide a tempering valve which is simple, durable and comparatively inexpensive to manufacture.

A further object is to provide a tempering or mixing valve especially adapted for use with a hot water faucet and cold and hot water pipes, so that the faucet itself can be used for discharging tempered or mixed water and the tempering valve can be manipulated to mix the hot and cold water in the desired proportion for securing any temperature required at the discharge of the hot water faucet.

A further object is to provide a tempering valve especially adapted for use in connection with a hot water heater such as the type shown in my copending application, Serial No. 604,557 filed April 11, 1932.

Still another object is to provide a tempering valve comprising a valve body having a bore therein, with hot and cold water inlets communicating with the bore, a valve plug being provided in the bore for plugging either the hot or cold water inlet or assuming an intermediate position between them and being adjustable so as to change the proportion of the hot and cold water, as desired, before it finally leaves the valve through a tempered water outlet.

Still a further object is to provide check valve means in the cold water inlet serving the purpose of preventing any of the hot water from flowing back through the cold water pipe.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a front elevation of a lavatory showing my tempering valve associated therewith and with a hot water heater.

Figure 2 is an enlarged sectional view on the line 2—2 of Figure 1 showing the valve adjusted to one position.

Figure 3 is a similar view except not entirely in section and showing the valve adjusted to a different position.

Figure 4 is a vertical sectional view on the line 4—4 of Figure 3; and

Figure 5 is a diagrammatic view showing the operation of the valve.

In Figure 1, I have shown a lavatory 10 supported by a post 12 and cold and hot water faucets 14 and 16, respectively. I have also shown a cold water pipe 18, a water heater A, a tempering valve B embodying my present invention and a tempered water pipe 20. There is also a hot water pipe which is indicated at 22 in Figure 2 for instance.

The water heater A is of any type for heating cold water for the purpose of providing hot water for a hot water faucet. It may be of the electrically heated automatically controlled type shown in my copending application hereinbefore referred to and the tempering valve B is especially adapted for such type of heater.

The valve B comprises a body 24 having a cold water inlet 26, a hot water inlet 28 and a tempered water outlet 30.

It is also provided with a bore 32 in which is slidably mounted a valve plug 34. The valve plug 34 is part of a valve stem 36 which has a threaded portion 38 coacting with a threaded boss 40 of the valve body 24. Suitable packing is provided around the stem 36 and retained in position by a packing nut 42. An operating handle 44 is mounted on the outer end of the valve stem 36.

Between the cold water inlet 26 and the bore 32 I provide a bore 46 somewhat smaller than the bore 32, as best shown in Figure 4. In the bore 46 I provide a valve seat 48 against which is seated by gravity, a check valve 50 of the ball type.

Between the tempered water outlet 30 and the bore 32 I provide a bore 52 which is somewhat larger than the bores 32 and 46 but terminates in a level bottom 54, as best shown in Figure 4.

The intersection of the bores 32, 46 and 52 is such that, as shown in Figure 5, a curved edge 32a is provided where the upper side of the bore 32 and the left side of the bore 52 meet. There is also a curved edge 46a where the lower side of the bore 32 and the right side of the bore 46 meet. The valve plug 34 has straight ends 34a and 34b adapted to advance toward or recede from the curved edges 32a and 46a, depending on the direction of rotation of the valve handle 44.

The valve plug 34 may be adjusted to a position entirely plugging the cold water bore 46 as shown in Figure 2 and in such position, a flange 56 thereof engages a shoulder 58 and such engagement serves as a limit stop for the movement of the valve plug 34 in one direction. In Figure 3 I have shown in solid lines the valve plug 34 at an intermediate position, while in dotted lines I have shown it entirely plugging the hot water bore 32.

From the foregoing, it will be obvious that either all cold or all hot water can flow through the valve body 24 to the tempered water outlet 30, or that half hot and half cold water can flow therethrough if the valve is adjusted as shown in Figure 3 by full lines. Figure 5 also shows the same adjustment in full lines. If it is desirable to increase the temperature of the water, the valve plug 34 can be adjusted to the dash line position *a* of Figure 5, while if it is desirable to decrease the temperature of the water, it can be adjusted to the dotted line position *b* thereof. It will also be obvious that any slight change in position will change the temperature of the water flowing out through the tempered water outlet 30 and that since screw threads are provided, the adjustment can be very minute if so desired.

The check valve 50 is very important because water when heated expands and there would therefore be some tendency for water from the bore 32 to enter the cold water pipe 18 because of such expansion causing higher pressure of the hot water.

The check valve 50 positively guards against such an event.

My valve is especially adapted for an automatic thermostatically controlled water heater because the water in such a heater is at a predetermined constant temperature and the cold water from the pipe 18 would also be at an approximately constant temperature. It will then be obvious that if the valve plug 34 is set to a given position, the temperature of the water from the hot water faucet 16 would be the same whenever the faucet is opened. The tempering valve, therefore, when once set does not need to be re-adjusted except when a different temperature of water is desired.

The particular arrangement of a valve plug which travels between two inlets so as to proportion the water differently from them to the tempered water outlet is one which very effectively and accurately adjusts the temperature of the water flowing from the hot water faucet. The valve, of course, cannot be used as a shut-off valve for the water, but is strictly one designed for the purpose of changing the proportion of fluid from two pipes flowing into a third one.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. For use with a hot water faucet and hot and cold water pipes, a tempering valve comprising a valve body having hot and cold water inlets and a tempered water outlet and a valve plug in said valve body and movable across the inner end of the bore of one of said water inlets and into and out of the bore of the other one to decrease the flow of water from one and increase it from the other one when moved in one direction and vice versa, said tempered water outlet being diametrically opposite and of larger diameter than said last mentioned inlet.

2. For use with a hot water faucet and hot and cold water pipes, a tempering valve comprising a valve body having hot and cold water inlets at right angles to each other and a tempered water outlet at right angles to said hot water inlet and in alignment with said cold water inlet, a valve plug in said valve body and movable between said hot and cold water inlets to decrease the flow of water from one and increase it from the other one when moved in one direction and vice versa and a check valve in said cold water inlet to prevent hot water from said hot water inlet entering said cold water inlet.

3. For use with a hot water faucet and hot and cold water pipes, a tempering valve comprising a valve body having hot and cold water inlets at right angles to each other and a tempered water outlet of larger diameter than and in alinement with said cold water inlet, a valve plug in said valve body and movable longitudinally of the bore of said hot water inlet and across the bore of said cold water inlet to decrease the flow of water from one and increase it from the other one and screw means for moving said valve plug.

4. In a valve of the character described, a valve body having a bore, a valve plug slidable therein, said valve body having a pair of inlets selectively communicating with said bore in different proportions depending on the position of said valve plug relative to said valve body, one of said inlets being aligned with said bore and the other one entering it laterally, a check valve within said valve body and in one of said inlets and opening toward said bore, said valve body having an outlet lateral to said bore and communicating with said bore in all positions of said valve plug and means for limiting the sliding movement of said valve plug in one direction to a position entirely plugging the laterally entering one of said inlet openings.

LEE W. HODGES.